United States Patent [19]

Matsui et al.

[11] 4,319,831
[45] Mar. 16, 1982

[54] CLEANING DEVICE IN A COPYING MACHINE

[75] Inventors: Masao Matsui, Takatsuki; Hiroshi Naito, Osaka, both of Japan

[73] Assignee: Kanebo, Ltd., Tokyo, Japan

[21] Appl. No.: 102,594

[22] Filed: Dec. 12, 1979

[30] Foreign Application Priority Data

Dec. 19, 1978 [JP] Japan .................................. 53/157879

[51] Int. Cl.³ ...................... G03G 15/06; G03G 21/00; A46B 15/00
[52] U.S. Cl. .................................. 355/15; 15/159 A; 15/256.52; 118/652
[58] Field of Search ............ 355/15; 15/256.5, 256.51, 15/256.52, 159 A; 118/652

[56] References Cited

U.S. PATENT DOCUMENTS

| | | | |
|---|---|---|---|
| 3,098,765 | 7/1963 | Keller et al. | 118/652 |
| 3,327,339 | 6/1967 | Lemelson | 15/159 A X |
| 3,780,391 | 12/1973 | Leenhouts | 355/15 X |
| 3,851,965 | 12/1974 | Furuichi et al. | 355/15 |
| 3,914,045 | 10/1976 | Namiki et al. | 355/15 |
| 3,955,533 | 5/1976 | Smith et al. | 355/15 X |
| 3,969,090 | 7/1976 | Sasema et al. | 15/159 A X |
| 4,144,610 | 3/1979 | Moore et al. | 15/159 A |

FOREIGN PATENT DOCUMENTS 54-97429  8/1979  Japan .................................. 15/159 A Primary Examiner—J. V. Truhe
Assistant Examiner—Richard M. Moose
Attorney, Agent, or Firm—Blanchard, Flynn, Thiel, Boutell & Tanis

[57] ABSTRACT

At least a part of the portion of a cleaning device to contact to the image retaining portion in a copying machine of a transferring system is composed of conductive composite fibers consisting of at least one conductive layer containing conductive fine particles and at least one nonconductive layer.

15 Claims, 11 Drawing Figures

CLEANING DEVICE IN A COPYING MACHINE

The present invention relates to a cleaning device in a copying machine, more particularly to a device for cleaning the toner remaining on an electrostatic image retaining portion (referred to as "image forming portion" hereinafter) after transfer of a developed image in an electrophotographic copying machine.

In an electrostatic printing process, a material having a charging property, which is composed of a semiconductor and/or an insulator, such a resin, is charged corresponding to an image in order to form an electrostatic image (latent image). This electrostatic image is developed by sticking thereon a powder (referred to as "toner" hereinafter) including a coloring agent. The developed image is transferred onto a paper, film, cloth or the like. This process has been widely used in copying machines and the like. There have been a variety of processes for forming the electrostatic images, which include, for example, (1) a process for forming the electrostatic image on an insulator by corona discharge, (2) a process using an image formed by means of an insulator having a charging property and a conductor having a non-charging property as a primary image, (3) a process wherein a photosensitive semiconductor, for example, a material which has an insulating property in the dark and becomes conductive upon being irradiated with light, is previously uniformly charged by corona discharge to form an electrostatic image, and then the electrostatic image is exposed in one shot or gradually by a scanning system to discharge the exposed portion, (4) a process for transferring an electrostatic image formed on an insulator to another insulator, and the like. The thus formed electrostatic image (latent image) is developed by a toner and the developed image is transferred. A cleaning device for removing the toner remaining on the image forming portion after the transfer (referred to as the "cleaning device" hereinafter) is necessary.

As the cleaning device, there has been widely used a system comprising contacting the image forming portion with a rotary brush consisting of fine fibers, a drum provided with piles or a belt provided with piles portion and removing the toner from the image forming portion. Although this system has been widely used, problems remain to be solved. Namely, when the image forming portion is strongly rubbed with a brush or the like to completely remove the toner at the image forming portion, the image forming portion is charged and the toner sticks reversely thereon, or the image forming portion is damaged by the friction. On the other hand, the toner sticks to the pile portion on the brush or the like and said toner again sticks to the image forming portion to stain the copy or form a fog. Animal fibers and regenerated cellulose artificial fibers have been heretofore used for the cleaning portion. However, these fibers lose their water content under an atmosphere having a low humidity due to heat generation in the copying machine or owing to ambient weather. They cause sticking of the toner and a strain of the remaining toner appears on the transferred image. Animal fibers and regenerated cellulose fibers have problems in strength and abrasion resistance. On the other hand, synthetic fibers, such as polyamide, polyester, polyacryl, polyolefin and polyvinyl fibers are excellent in strength, durability and abrasion resistance but they exhibit a high toner sticking property, so that these fibers have not been used for the cleaning device. When metal fibers and carbon fibers are used, these fibers are low in the toner sticking property and the cleaning ability is improved, but these inorganic fibers are hard, so that the image forming portion is readily damaged, which is a great drawback.

The inventors have made earnest studies with respect to these drawbacks of the cleaning devices of the prior copying machines and have found that the cleaning ability and the durability of the cleaning device can be greatly improved by using conductive composite fibers containing conductive fine particles for the portion of the cleaning device which contacts the image forming portion of the copying machine, and thus have accomplished the present invention.

An object of the present invention is to provide an improved cleaning device wherein the durability and the cleaning ability are excellent and the image forming portion is scarcely damaged.

The cleaning device of the present invention is characterized in that a part of the portion which contacts the image forming portion to be cleaned of the transferring system in the copying machine is composed of conductive composite fibers containing conductive fine particles.

The above described conductive composite fibers are obtained by conjugate bonding a conductive part (referred to as "conductive layer" hereinafter) containing conductive fine particles and a non-conductive part (referred to as "non-conductive layer" hereinafter) in a monofilament.

BRIEF DESCRIPTION OF THE DRAWINGS

For better understanding of the invention, reference is made to the accompanying drawings, wherein:

Referring to FIGS. 1–8, numeral 1 identifies the conductive layer and numeral 2 identifies the non-conductive layer. FIGS. 1 and 5 are embodiments of sheath-core type fibers. In FIG. 1 the core is conductive layer, and in FIG. 5 the sheath is the conductive layer. FIG. 2 shows a side-by-side type fiber, FIG. 3 is a three layer composite fiber and FIG. 4 is a radial composite fiber. FIGS. 6–8 are embodiments of multi-layer composite fibers. Other composite forms, for example, non-circular cross-sections, may be used, if the composite fibers have sufficient conductivity. That is, if the electric resistance of one fiber in its lengthwise direction is less than $10^{15}$ Ω/cm, preferably less than $10^{13}$ Ω/cm, more particularly less than $10^{11}$ Ω/cm, the object of the present invention can be attained. The electric resistance of the conductive composite fiber is measured by applying a direct current voltage of 1,000 V to a fiber having a length of 10 cm. In order to attain the object of the present invention, it is necessary to use fibers which have an excellent conductivity under a low humidity.

Figure 1:
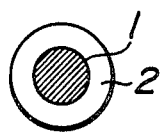
FIGS. 1–8 are cross-sectional views of conductive composite fibers suitable for use in the present invention.
Figure 2:
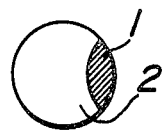

The measurement of the electric resistance must be carried out under an atmosphere of lower than 40% RH at 20° C., and it is more preferable to effect the measurement under a humidity of 10–30% RH.

The first characteristic of the cleaning device composed of the composite fibers having conductive layers containing conductive fine particles consists in that the toner sticking property and the cleaning ability of said fibers are not varied too greatly by humidity and, thus, excellent toner separation is always obtained. Accordingly, even if the inner portion of the copying machine becomes low in humidity, a satisfactory cleaning ability is always maintained. The second characteristic consists in that the charge at the image forming portion and the toner are removed, and, thus, cleaning is fully effected and the formation of a ghost image and staining owing to the remaining charge are diminished. The third characteristic consists in that the image forming portion is scarcely damaged.

Conductive fine particles contained in the composite fibers to be used in the present invention include carbon blacks, metal powders and the like, which have a diameter of less than $10\mu$, preferably less than $3\mu$, more particularly less than $1\mu$. Other conductive particles, for example, organic semiconductors, may be used in the present invention if they have excellent conductivity at a low humidity. In general, hydrophilic organic substances, for example, conductive substances containing nonionic or ionic hydrophilic groups, such as ether bond, hydroxyl group, carboxyl group, amino group, sulfonic acid group, phosphoric acid group and the like lower the conductivity at a low humidity or are often decomposed by light or heat and they are not preferable in view of the stability of their antistatic property and their durability. However, these organic substances having hydrophilic groups may be used as auxiliary substances by using them together with carbon black, metal powders and the like in order to stengthen the conductivity of the carbon black and the like.

In general, carbon black cannot provide sufficient conductivity unless a fairly large amount is mixed into the spinning material. The mixture ratio of the conductive fine particles depends upon the properties of the fine particles, particularly the agglomerating property and the property of forming linkage structure, the properties of the matrix polymor, particularly its dispersibility, the properties of supplemental additives, such as stabilizer, antioxidant and the like, and the mixed state of these additives. For example, when conductive carbon black is mixed with polymers, such as polyamides (nylon 6, nylon 66 and the like), polyesters (polyethylene terephthalate, polybutylene terephthalate and the like), polyolefins (polyethylene, polypropylene and the like), regenerated celluloses (rayon, acetate and the like), polyacrylonitriles and the like, the mixture ratio should be 10–40% by weight, and particularly an amount of 20–30% by weight provides sufficient conductivity. In the case of super-conductive carbon black, which readily forms the linkage structure, sufficient conductivity can be obtained by adding an amount of 5–20% by weight.

Figure 3:
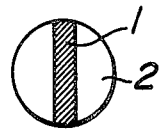
Figure 4:
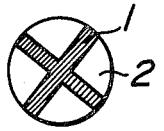
Figure 5:
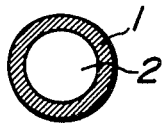
Figure 6:
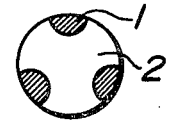
Figure 7:
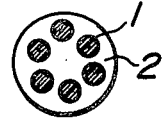
Figure 8:
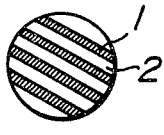

A spinning material containing such a large amount of conductive fine particles is difficult to spin, and such a spinning material cannot be generally spun alone. However, such a spinning material can be easily conjugate-spun together with a usual spinning material. The conjugate spinning can be carried out by well-known processes. FIGS. 1–8 show embodiments of cross-sections of the composite structure as mentioned above. In general, in order to prevent sticking of the toner and improve the cleaning ability, it is preferable to arrange the conductive layer on the outer surface of the composite fibers. The composite fibers shown in FIGS. 1 and 7, wherein the conductive layer forms the core portion, are somewhat poor in preventing the toner from sticking. However, if a proper combination of the conductive substance and the spinning material is selected, the object of the present invention can be satisfactorily attained. On the other hand, a conductive layer containing a large amount of the conductive fine particles is high in rubbing force. The higher the rubbing force, the stronger is the cleaning ability, but when the abrasion resistance of the image forming portion to be cleaned is low, damage of the image forming portion becomes a problem. Of course, the composite fibers according to the present invention can more greatly reduce the damage of the image forming portion than the above described inorganic fibers, but when damage of the image forming portion becomes a problem, even with such composite fibers, composite fibers are used wherein the conductive layer is not exposed on the surface of the composite fibers. For example, there are used composite fibers in which the conductive layer is arranged at the core portion or in which the exposed area is small. In the composite fibers as shown in FIG. 5, wherein the sheath portion is the conductive layer, the abrasion of the image forming portion should be taken into consideration. From this viewpoint, the percentage of the outer surface area of the composite fiber that is occupied by the conductive layer is preferably less than 50%, particularly less than 30%. In order to strengthen the cleaning ability and to make easy the grounding of the connected composite fibers to the metal support (even if grounding is not effected, a satisfactory effect can be obtained, but in order to enhance the prevention of sticking of the toner, it is preferable to effect the grounding), the lower limit of the percentage of the outer surface area that is occupied by the conductive layer is not less than 1%, preferably not less than 5%. In view of abrasion, cleaning ability, prevention of the sticking of the toner and ease of gounding, the percentage of the outer surface area that is occupied by the conductive layer in the composite fibers is 1–50%, preferably 5–30%.

The conductivity of the conductive layer varies according to various causes as mentioned above but in order to attain the object of the present invention, the electric resistance of the composite fibers must be not more than $10^{15}$ $\Omega$/cm, preferably not more than $10^{13}$ $\Omega$/cm, more particularly not more than $10^{11}$ $\Omega$/cm. In general, a lower electric resistance provides a higher ability to prevent sticking of the toner, that is, a better cleaning ability.

The composite fibers are produced by melting the spinning material, extruding the melt, cooling the spun fibers or removing a solvent from the spun fibers to solidify the spun fibers, if necessary drawing the solidified spun fibers and if necessary heat setting the spun fibers. In many cases, the conductivity is lowered by the drawing, so that it is preferred that the conductivity be measured after drawing, and if necessary after heat setting.

The polymers used for making the conductive composite fibers employed in the present invention must be selected by taking the following points into consideration.

(1) The matrix polymer in the conductive layer can be mixed with the conductive particles and the mixture has sufficient conductivity.

(2) The image forming portion (photosensitive material) to be cleaned must scarcely be damaged and the hardness must not be excessive.

(3) The polymer must have moderate elasticity.

Metal fibers are not proper in view of the damage they cause to the image forming portion and their elasticity (a bent deformation is not restored). Carbon fibers damage the image forming portion and further are low in elasticity and brittle, so that the carbon fibers are broken and have no durability.

A major part of the conventionally used spinning materials can be employed as the polymers in the conductive composite fibers, but polymers containing conductive particles (carbon black, metal powders and the like) and pigment particles (titanium dioxide and the like) tend to damage the image forming portion, so that it is necessary to use them with care.

The elasticity of the fibers is particularly important, because heating and cooling are repeated during use and strain (bending strain) is continuously applied to the fibers for a long time. Polymers (for example, polyethylene, polypropylene and the like) having a low glass transition temperature should be used with care, because strain thereof becomes set by heating and cooling. The glass transition temperature must be higher than room temperature, preferably higher than 50° C., more particularly higher than 80° C. In general, polymers having a high moisture content are lower in glass transition temperature and the temperature for setting the strain in a moist state, so that plastic deformation readily occurs. Such polymers are not preferable. The moisture content (equilibrium moisture content at 65% RH, 20° C.) is preferably less than 5%, more preferably less than 2%, more particularly less than 1%.

The term "glass transition temperature" used herein means the temperature at which the thermal movement of the main chain at the non-crystal portion in the polymer is released and Young's modulus is noticeably decreased, that is, the secondary transition temperature. This transition temperature is determined by measuring the temperature dependency of the Young's modulus and determining the point where the temperature gradient (negative) becomes very steep (generally a fairly clear curved point). The reduction rate of the Young's modulus at the temperature in the middle of this transition zone is at a maximum and the dynamic loss factor (tan δ) at a low frequency becomes a maximum. It has been known that the properties of polymers fairly vary at the temperature zone lower than the transition starting temperature and the temperature zone higher than the transition starting temperature, particularly at a temperature higher than the temperature of the middle of the transition zone. For the object of the present invention, it is desirable that polymers having a glass transition (starting) temperature higher than room temperature (20° C.) be used for the main component (more than 50%) of the composite fibers.

As the spinning materials having a high glass transition temperature, a low moisture content and an excellent elasticity, mention may be made of polyamides having a long repeating unit (using polymerizable starting materials having 10 or more carbon atoms), such as nylon 11, nylon 12, nylon 610, nylon 612 and the like; aromatic polyesters, such as polyethylene terephthalate, polybutylene terephthalate, polyethylene oxybenzoate and the like; polyacrylonitriles; copolymers or mixtures consisting mainly (for example, more than 80% by weight) of polyamide, polyester and polyacrylonitrile; regenerated celluloses, such as rayons and acetates having a high moisture content but low plastic deformation. Of course, it is desirable that all polymers to be used for production of the conductive composite fibers are selected from the above described polymers, but a part of the composite fibers, for example, less than 50% of the composite fibers, may be the other polymers. For example, even if the conductive portion is somewhat poor in elasticity, said portion may be composed of polymers having a high conductivity, such as polymers mixed with polyethylene or polyalkylene oxide. The non-conductive component must then be selected by considering the above described elasticity, the possibility of damage of the image forming portion and the durability of the polymer itself.

Aromatic polyesters having a high crystallinity, such as polyethylene terephthalate and the like, are more or less poor in miscibility with conductive fine particles, such as carbon black, and are somewhat low in spinnability. In such a case, miscibility is improved and good spinnability is obtained by mixing or copolymerizing 1–20% by weight, preferably 3–15% by weight, of a third component of polyalkylene oxides or aliphatic polyesters to said aromatic polyesters.

Polyamides having short repeating units, such as nylon 6, nylon 66 and the like, have very excellent abrasion resistance but they are high in the water absorbing property, so that the strain is apt to become set, and thus it is desirable to pay attention to the shape and the like of the brush.

The conductive layer and/or the non-conductive layer are preferably low in their friction coefficients, as is seen from the above explanation. Therefore, it is possible to mix a small amount, for example, less than 10%, preferably less than 5%, of a lubricant with the spinning material. As the lubricants, use may be made of wax (paraffins, compounds having alkyl groups of 8 or more carbon atoms, surfactants and the like), polyethylenes (inclusive modified products, copolymers), silicone compounds (oils, polymers of polyorganosiloxanes), fluorine compounds (oils, polymers of polytetrafluoroethylene, other fluorocarbons and the like). The lubricants provide satisfactory effects in amounts of more than 0.01% by weight, preferably 0.05–1% by weight. Similarly, it is effective to stick these lubricants on the surfaces of the fibers or cover the surfaces of the fibers with these lubricants.

Means for reducing the damage of the image forming portion due to friction of the piles, other than by utilizing lubricants, includes making the top of the piles round or fine. For this purpose, the piles on the brush are contacted and polished with a roll to which is adhered a proper sand cloth, while rotating the brush to process the top of the piles.

Moreover, it is possible to use polymer compositions having an antistatic property, which are obtained by mixing the compounds having the above described hydrophilic groups, in the spinning material for the composite fibers. For example, a polymer having an antistatic property, which is mixed with 0.5–10% by weight of polyalkylene oxides, such as ethylene glycol and the like (surfactants), has an auxiliary effect of strengthening the cleaning ability and is preferable. However, as mentioned above, a major part of the compounds having hydrophilic groups are poor in stability, so that care should be taken in their use. The spinning materials for the composite fibers are readily deteriorated by the heat in the copying machine, ions and ozone owing to corona discharge and ultraviolet rays at the exposing portion, so that it is desirable to incorporate an antioxidant, a heat stabilizer, a ultraviolet absorbing agent and the like in the fibers. Similarly, the spinning material may contain a coloring agent (for blocking ultraviolet rays), a pigment and the like. For example, when less than 5% by weight of titanium dioxide is mixed in the fibers, friction is increased and cleaning ability is improved, but the degree of abrasion degree at the image forming portion becomes large, so that the mixture ratio is selected depending upon these circumstances.

The fineness of the composite fibers may be optionally selected depending upon the application. A fineness of less than 100 denier/filament, particularly less than 30 denier/filament is generally used. When the fineness is too large, the hardness is too high, while when the fineness is too small, the fibers are too flexible, so that a proper range (for example 3–300 deniers) is selected.

The length of the piles may be optionally selected but a length of about 3–50 mm, preferably about 5–30 mm, is customarily used. In general, when the length of the piles is long, the fineness of the fibers must be larger.

At least a part of the fibers that contact the image forming portion to be cleaned in the copying machine, for example, more than 0.5% by weight, preferably more than 2% by weight, more particularly more than 10% by weight of the fibers at the contacting portion, is composed of the above described conductive composite fibers. It is most preferable in the prevention of sticking of the toner that all the contacting portion is composed of the conductive composite fibers. However, it is possible to use the conductive composite fibers together with other fibers. In this case, it is necessary to adjust the mixture ratio so that the charged voltage (absolute value) due to friction of the fibers at the contacting portion during the operation (rubbing) is lower than 2,000 V, preferably lower than 1,000 V, more particularly lower than 500 V. If all the fibers at the contacting portion are the conductive composite fibers, it is easy to make the charged voltage lower than 1,000 V, or even lower than 500 V, and in many cases, said voltage is lower than 100 V. On the other hand, when fibers composed of conventional non-conductive polymers are used, the charged voltage is higher than 15,000 V and the cleaning ability is very poor. When fibers having an antistatic property, which contain a compound having hydrophilic groups, are used, the charged voltage is 2,000–15,000 V and the cleaning ability is fairly poor.

The cleaning device according to the present invention is provided in the form of a rotary brush, a rotary drum or a belt having piles, at least a part of which is composed of the above-described conductive composite fibers, so that said device has a very excellent cleaning ability and beautiful copies, which are scarcely stained, can be obtained. In particular, excellent performance is attained under atmosphere having a low humidity due to the season, weather, heating, heat generation in the copying machines, and the lowering of performance due to oxidation owing to heat or light scarcely occurs. Also, excellent durability is obtained, ageing at the image forming portion due to abrasion can be prevented, and frequency of repair and cleaning of the copying machine and can be broadly decreased.

The following examples are given for the purpose of illustration of this invention and are not intended as limitations thereof.

EXAMPLE 1

Figure 9:
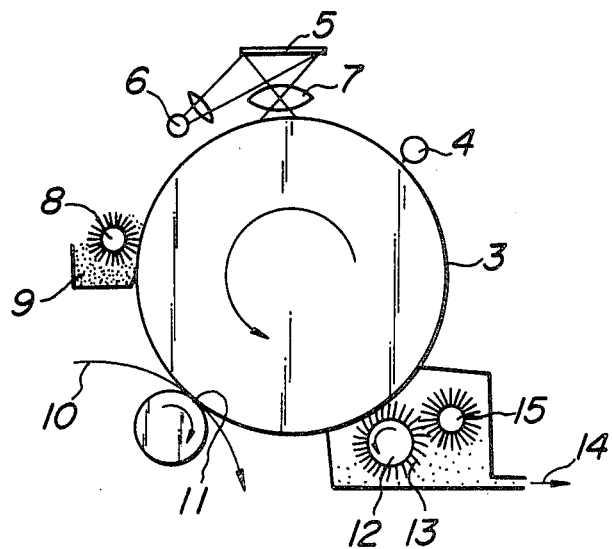
FIG. 9 is a schematic view showing an embodiment of a copying machine provided with the cleaning device according to the present invention.

In FIG. 9, numeral 3 is an image forming portion (photosensitive drum) composed of a photosensitive semiconductor, such as selenium, zinc oxide, cadmium sulfide and the like and it rotates in the direction of the arrow. Numeral 4 is a corona discharger by which the image forming portion 3 is uniformly charged. Numeral 5 is a document to be copied and the image thereof is irradiated with a light source 6 and projected and exposed to the image forming portion 3 through an optical system 7. An electrostatic image (latent image) equivalent to the image on the document is formed. Numeral 8 is a developer and toner 9 is stuck to the image forming portion corresponding to the electrostatic image, and the image from the document is thereby developed.

The developed image reaches a transfer portion 11 and is transferred to a paper (or film or cloth) 10 and if necessary, is fixed thereon. The toner remaining on the image forming portion 3 after transferring is removed with a cleaning brush 12 and is sucked into a suction portion 14. Numeral 13 represents the piles on the cleaning brush. The present invention is characterized in that the piles are composed of the above described particular conductive composite fibers. Numeral 15 is a supplemental brush, which removes the toner stuck on the brush 12. The piles of this supplemental brush may be composed of the above described conductive composite fibers or a mixture of such composite fibers with metal fine fibers or usual fibers. Instead of the supplemental brush 15, a simple metal rod may be arranged and contacted with the piles 13.

26% by weight of conductive carbon black (fine particles), 73.45% by weight of nylon 610, 0.5% by weight of an amide wax (dispersing agent) and 0.05% by weight of a phenol antioxidant are mixed, and the mixture is melted and kneaded to obtain a conductive polymer $P_1$. The specific resistance of this polymer $P_1$, was $5.7 \times 10^2$ $\Omega$.cm. The polymer $P_1$ and conventional nylon 610 were conjugate-spun in a conjugate ratio (volume) of 1:4 in the structure as shown in FIG. 3 through spinning orifices having a diameter of 0.35 mm at 275° C. and the spun filaments were wound up at a rate of 1,200 m/min while being cooled and oiled. Said filaments were then drawn to 2.8 times on a drawing bobbin at 80° C. and heat-treated at 160° C. to obtain filaments $Y_1$ of 150 denier/24 filament (monofilament: 6.25 d). The resistance of the monofilament $Y_1$ was $2.0 \times 10^{11}$ $\Omega$.cm. A knit having piles of a length of 10 mm was knitted with the filaments $Y_1$ and said knit was wound around a metal drum having a diameter of 60 mm and bonded to said drum with an adhesive having whereby to form a cylindrical brush. The metal drum was grounded, whereby the filaments $Y_1$ were grounded. By using the machine as shown in FIG. 9 provided with this brush, using a grounded metal rod instead of a supplemental brush 15, and using selenium as the photosensitive material, copying was conducted.

A large number of papers were copied by using as a document a photograph wherein dark portions occupied a large area. When the brush made of the filaments $Y_1$ was used, beautiful copies, which were barely stained, were obtained in the initial stage, and even after about 30,000 papers were copied, the image quality did not substantially vary.

For comparison, when a similar brush was made using cellulose acetate fibers and copying was effected using such a brush, some fog appeared after about 50 papers were copied, the stain became fairly noticeable when about 5,000 papers were copied, and at 10,000 papers, the copy was stained to such a degree that the cleaning device should have been disassembled and cleaned.

EXAMPLE 2

Figure 10:
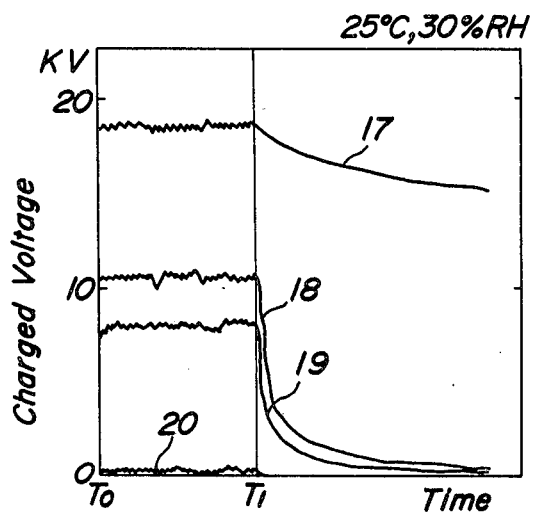
FIGS. 10 and 11 are graphs showing the data obtained by measuring the variation of the charged voltage of brushes during operation of the copying machine, and after terminating the operation, when brushes provided with various fiber piles were used in the portion of the brush which contacts the electrostatic image retaining portion of the copying machine.
Figure 11:
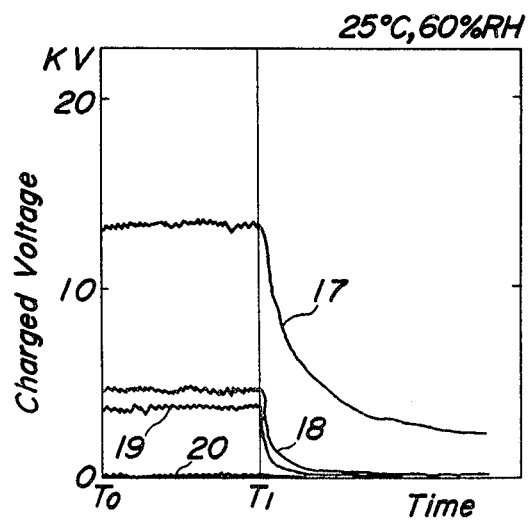

Copying was conducted in the same manner as described in Example 1 by using brushes having piles composed of various fibers, and the charged voltages during operation (during rubbing) and after termination of the operation were measured. The measured results are shown in FIG. 10 and FIG. 11. In these figures, the ordinate shows the charged voltage and the abscissa shows time. From $T_0$ to $T_1$ shows the time of operation, and the period after $T_1$ shows the stopping time. FIG. 10 shows the result measured at 25° C., 30% RH and FIG. 11 shows the result measured at 25° C., 60% RH.

In FIGS. 10 and 11, the curve 17 shows the charge and the discharge of a brush composed of nylon 12. The charged voltage is very high and the discharge is slow. The curve 18 shows the charge and the discharge of the fiber having an antistatic property, wherein 6% by weight of polyethylene glycol having a molecular weight of 30,000 is mixed in nylon 12, and curve 19 shows the charge and discharge of cellulose acetate fiber. Curve 20 shows data for a brush produced by using filament $Y_2$ obtained by conjugate-spinning a conductive polymer $P_2$ prepared by mixing 72.45% by weight of nylon 12, 27% by weight of conductive carbon black, 0.5% by weight of an amide wax (dispersing agent) and 0.05% by weight of an antioxidant (phenol derivative) and nylon 12 in the structure as shown in FIG. 4 and treating the spun filaments in the same manner as described in Example 1. The specific resistance of the polymer $P_2$ was $1.2 \times 10^4$ Ω.cm and the resistance of the monofilament $Y_2$ was $8.6 \times 10^{10}$ Ω.cm.

As seen from FIG. 10 and FIG. 11, the charged voltage of the brush using the conductive composite fibers is very low and in practice there is substantially no charge. After 5,000 papers were copied by using each of the above described brushes, the stain of the brushes was observed and the obtained results are shown in the following Table 1.

TABLE 1

| Material of brush | Stain | Remarks |
|---|---|---|
| nylon 12 | Very noticeable | Comparative example |
| nylon 12 having antistatic property | Fairly noticeable | Comparative example |
| Cellulose acetate | Fairly noticeable | Comparative example |
| nylon 12 conductive composite fiber | Slight | Example |

In the copied papers, the copies made using nylon 12 showed very noticeable staining on the whole, the copies made using nylon 12 having antistatic property and cellulose acetate showed fairly noticeable staining, but the copies made using nylon 12 conductive composite fiber did not show substantial staining.

Accordingly, the correlation between the staining and the friction charged voltage is apparent.

The resistance of the nylon 12 monofilament was more than $10^{18}$ Ω/cm, and the resistances of nylon 12 having antistatic property and cellulose acetate were $7 \times 10^{17}$ Ω/cm, $3 \times 10^{16}$ Ω/cm, respectively.

EXAMPLE 3

Polyethylene having a specific resistance of $7.1 \times 10^2$ Ω/cm obtained by melt-mixing 25% by weight of conductive carbon black is referred to as $P_3$. By using $P_3$ as the core and various polymers as the sheath, sheath-core type filaments $Y_3 \sim Y_{10}$ were produced, type as shown in FIG. 1, in a conjugate ratio of 1:1 (volume) through melt-spinning and drawing in the same manner as described in Example 1. Polymers used for the sheath in the filaments and the qualities thereof are shown in the following Table 2.

TABLE 2

| Filament | Sheath polymer | Melting point (°C.) | Glass transition temperature (°C.) | Equilibrium moisture content (%) | Resistance of monofilament (Ω/cm) |
|---|---|---|---|---|---|
| $Y_3$ | nylon 66 | 264 | about 60 | 3.9 | $6.2 \times 10^{10}$ |
| $Y_4$ | nylon 6 | 222 | about 60 | 4.5 | $6.1 \times 10^{10}$ |
| $Y_5$ | nylon 610 | 215 | about 60 | 0.5 | $6.4 \times 10^{10}$ |
| $Y_6$ | nylon 12 | 179 | about 40 | 0.4 | $6.2 \times 10^{10}$ |
| $Y_7$ | polyethylene | 120 | about −50 | less than 0.1 | $6.5 \times 10^{10}$ |
| $Y_8$ | polypropylene | 175 | about −20 | less than 0.1 | $6.3 \times 10^{10}$ |
| $Y_9$ | polyethylene terephthalate | 261 | about 90 | less than 0.1 | $6.0 \times 10^{10}$ |
| $Y_{10}$ | polybutylene terephthalate | 225 | about 60 | less than 0.1 | $6.7 \times 10^{10}$ |

In the case where nylon 12, polyethylene and polypropylene were used for the sheath, the drawing temperature was 40° C. and the heat-treating temperatures were 120° C., 100° C. and 100° C., respectively.

The brushes were produced by using the filaments $Y_3 \sim Y_{10}$ respectively and the copying tests were conducted in the same manner as described in Example 1. The staining of the copied papers was observed in the 500th paper, 3,000th paper and 20,000th paper, and the obtained results are shown in the following Table 3.

TABLE 3

| Filament | Sheath component | Stain of copied paper 500th | 3,000th | 20,000th |
|---|---|---|---|---|
| $Y_3$ | nylon 66 | A | C ~ B | D |
| $Y_4$ | nylon 6 | A | C | E |
| $Y_5$ | nylon 610 | A | A | B |
| $Y_6$ | nylon 12 | A | A | B |
| $Y_7$ | polyethylene | A | D | E |
| $Y_8$ | polypropylene | A | D | E |
| $Y_9$ | polyethylene terephthalate | A | A | B |
| $Y_{10}$ | polybutylene terephthalate | A | A | B |

Note:
A: very low in stain
B: low in stain
C: more or less noticeable in stain
D: noticeable in stain
E: very noticeable in stain When the state of the brushes after the test was observed, no stain in any of the brushes was noticeable, but in the brushes using $Y_3$, $Y_4$, $Y_7$ and $Y_8$, the deformation of the piles was noticeable and the contact to the portion to be cleaned was not satisfactory. Particularly, the deformations of $Y_7$ and $Y_8$ were largest and that of $Y_4$ was next largest. The glass transition temperatures in $Y_7$ and $Y_8$ were lower than room temperature and the brushes of these filaments were plastically deformed. $Y_3$ and $Y_4$ were more or less higher in equilibrium moisture content which seems to cause the plasticizing phenomenon due to water. For example, the equilibrium moisture content of nylon 6 is 2.5-4.5% by weight at 20° C., 65% RH and the glass transition temperature under these conditions lowers to 0°-20° C. Fibers having a higher moisture absorbing property are not preferable, because even if the humidity is low owing to heat generation in the copying machine during use, when the humidity increases when the machine is not in use, for example by cooling at night or due to weather, the fibers absorb moisture and the piles of the brush may deform and such fibers are not preferable.

However, even in the above described filaments $Y_3$, $Y_4$, $Y_7$ and $Y_8$, the above described deformation problem does not substantially occur if the fineness of the monofilament is made somewhat larger, the piles are made shorter, the heat treatment of the filaments is sufficiently carried out, the shape or structure of the copying machine is varied, or the piles are forcefully contacted to the portion to be cleaned by means of an elastic mechanism. If the brush is rotated at a superhigh speed, for example, more than 5,000 rpm, the brush stands up straight because of centrifugal force and the above described deformation problem does not substantially occur. Fibers having a high moisture absorbing property and polymers having a low glass transistion temperature can be used but it is necessary to take the deformation of such fibers and polymers into consideration. On the other hand, fibers having a high glass transition temperature (higher than room temperature) and a low moisture absorbing property (for example, less than 1% of equilibrium moisture content) are not substantially plastically deformed and such fibers are preferable.

What is claimed is:

1. In an electrostatic copying machine comprising a member adapted to receive an electrostatic latent image on its surface, a developer system adapted to apply toner to the surface of said member to develop the electrostatic latent image to form a developed image on said member, a transfer system adapted to transfer the developed image from the surface of said member to another substrate and a cleaning device for removing residual toner that adheres to the surface to said member after the developed image has been transferred, the improvement wherein the contacting portion of said cleaning device that contacts the surface of said member for removing the residual toner comprises electrically conductive, synthetic resin, composite fibers, said composite fibers consisting of at least one electrically conductive layer containing electrically conductive fine particles and at least one electrically non-conductive layer.

2. A machine as claimed in claim 1, wherein said contacting portion is a rotary brush or a belt having piles.

3. A machine as claimed in claim 1 or claim 2, wherein more than 10% by weight of the fibers of said contacting portion are said composite fibers.

4. A machine as claimed in claim 1 or claim 2, wherein said electrically conductive fine particles are carbon black particles.

5. A machine as claimed in claim 1 or claim 2, wherein more than 50% of the synthetic resin in said electrically conductive layer or layers and said electrically non-conductive layer or layers in said composite fibers is polyamide having a long repeating unit produced by using a monomer having 10 or more carbon atoms.

6. A machine as claimed in claim 1 or claim 2, wherein more than 50% of the synthetic resin in said electrically conductive layer or layers and said electrically non-conductive layer or layers in said composite fibers is polyester selected from the group consisting of polyethylene terephthalate, polyethylene oxybenzoate, polybutylene terephthlate and copolyesters composed mainly of the foregoing polyesters.

7. A machine as claimed in claim 1 or claim 2, wherein more than 50% of the synthetic resin in said electrically conductive layer or layers and said electrically non-conductive layer or layers in said composite fibers is polyacrylonitrile.

8. A machine as claimed in claim 1 or claim 2, wherein more than 50% of the synthetic resin in said electrically conductive layer or layers and said electrically non-conductive layer or layers in said composite fibers is regenerated cellulose.

9. A machine as claimed in claim 1 or claim 2, wherein said electrically conductive layer or layers and said electrically non-conductive layer or layers in said composite fibers contain polyalkylene oxides or a surfactant.

10. A machine as claimed in claim 1 or claim 2, wherein said electrically conductive layer or layers and said electrically non-conductive layer or layers in said composite fibers contain wax, polyethylene, silicone compound or fluorine compound.

11. A machine as claimed in claim 1 or claim 2, wherein said composite fibers have an electric resistance of less than $10^{15}$ $\Omega$/cm.

12. A machine as claimed in claim 11, wherein said composite fibers have an electric resistance of less than $10^{13}$ $\Omega$/cm.

13. A machine as claimed in claim 1 or 2, wherein the percentage of the outer surface area of said composite fiber occupied by said electrically conductive layer or layers is not more than 50%.

14. A machine as claimed in claim 1, in which said synthetic resin has a glass transition temperature of higher than 50° C. and an equilibrium moisture content, at 65% RH and 20° C., of less than 5%.

15. A machine as claimed in claim 1, in which said synthetic resin has a glass transition temperature of higher than 80° C. and an equilibrium moisture content, at 65% RH and 20° C., of less than 2%.

* * * * *

UNITED STATES PATENT AND TRADEMARK OFFICE
CERTIFICATE OF CORRECTION

PATENT NO. : 4 319 831
DATED : March 16, 1982
INVENTOR(S) :

It is certified that error appears in the above—identified patent and that said Letters Patent is hereby corrected as shown below:

Column 11, Line 54; change "to" (second occurrence) to ---of---.

Signed and Sealed this

Twenty-seventh Day of July 1982

[SEAL]

Attest:

Attesting Officer

GERALD J. MOSSINGHOFF

Commissioner of Patents and Trademarks